United States Patent
Miao et al.

(10) Patent No.: US 9,655,024 B2
(45) Date of Patent: May 16, 2017

(54) METHOD AND APPARATUS FOR CONTROLLING HANDOVER IN COGNITIVE RADIO SYSTEM

(71) Applicant: ZTE CORPORATION, Shenzhen, Guangdong Province (CN)

(72) Inventors: Ting Miao, Shenzhen (CN); Yan Li, Shenzhen (CN); Xing Liu, Shenzhen (CN); Bin Wang, Shenzhen (CN); Longtao Ren, Shenzhen (CN); Yuanyuan Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/429,490

(22) PCT Filed: Aug. 29, 2013

(86) PCT No.: PCT/CN2013/082550
§ 371 (c)(1),
(2) Date: Mar. 19, 2015

(87) PCT Pub. No.: WO2014/044116
PCT Pub. Date: Mar. 27, 2014

(65) Prior Publication Data
US 2015/0230146 A1 Aug. 13, 2015

(30) Foreign Application Priority Data
Sep. 19, 2012 (CN) .......................... 2012 1 0349096

(51) Int. Cl.
*H04W 36/30* (2009.01)
*H04W 24/10* (2009.01)
(Continued)

(52) U.S. Cl.
CPC .......... *H04W 36/30* (2013.01); *H04W 24/10* (2013.01); *H04W 36/0066* (2013.01);
(Continued)

(58) Field of Classification Search
CPC ............................. H04W 16/14; H04W 24/02
(Continued)

(56) References Cited

U.S. PATENT DOCUMENTS

| 2012/0094681 A1* | 4/2012 | Freda ................... H04W 72/02 455/452.1 |
| 2013/0115949 A1* | 5/2013 | Centonza ............ H04W 36/245 455/436 |

(Continued)

FOREIGN PATENT DOCUMENTS

| CN | 101541053 A | 9/2009 |
| CN | 101557622 A | 10/2009 |

(Continued)

OTHER PUBLICATIONS

XP014067083A; ETSI TR 103 063 V0.0.12(May 2011); Reconfigurable Radio Systems(RRS); Use Cases for Reconfigurable Radio Systems operating in IMT bands and GSM bands for intra-operator scenarios.

*Primary Examiner* — Thomas Lett
(74) *Attorney, Agent, or Firm* — Ling Wu; Stephen Yang; Ling and Yang Intellectual Property

(57) ABSTRACT

A method and apparatus for controlling a handover in a cognitive radio system are used to control a cell handover process of a user equipment, and can hand over the user equipment to an appropriate target cell as far as possible. The method includes: a source base station receiving a measurement report send by a user equipment; the source base station controlling a handover of the user equipment according to the measurement report, radio resource man- (Continued)

agement information, and reconfiguration related information. The apparatus is located in the source base station and includes a receiving module and a handover controlling module.

6 Claims, 5 Drawing Sheets

(51) Int. Cl.
    *H04W 36/00*     (2009.01)
    *H04W 36/38*     (2009.01)
    *H04W 36/08*     (2009.01)
    *H04W 88/08*     (2009.01)

(52) U.S. Cl.
    CPC ....... *H04W 36/0083* (2013.01); *H04W 36/38* (2013.01); *H04W 36/08* (2013.01); *H04W 88/08* (2013.01)

(58) Field of Classification Search
    USPC .................................................. 455/436, 450
    See application file for complete search history.

(56) References Cited

U.S. PATENT DOCUMENTS

2013/0203416 A1*   8/2013   Raaf ..................... H04W 36/32
                                                                                                         455/436
2014/0192771 A1*   7/2014   Jung ..................... H04W 36/08
                                                                                                         370/331

FOREIGN PATENT DOCUMENTS

| CN | 102281601 A | 12/2011 |
| EP | 1973367 A2 | 9/2008 |
| EP | 2720489 A1 | 4/2014 |
| GB | 2479534 A | 10/2011 |
| WO | WO2012114154 A | 8/2012 |

* cited by examiner

METHOD AND APPARATUS FOR CONTROLLING HANDOVER IN COGNITIVE RADIO SYSTEM

TECHNICAL FIELD

The present document relates to the field of wireless communication and cognitive radio technology, and more particularly, to a method and apparatus for controlling a handover in a cognitive radio system.

BACKGROUND OF THE INVENTION

With the continuous progress of radio technology, a wide range of radio services emerge massively, but the spectrum resources on which the radio services rely are limited, and facing to the increasing user demand for bandwidth, there are situations that spectrum resources are very short; in the traditional fixed spectrum allocation mode, on the other hand, the utilization of spectrum resources is not high. In a sense, this spectrum allocation system in which the spectrum resources are fixedly allocated to the authorized systems results in extreme shortage of the spectrum resources. The cognitive radio (CR) technology breaks the fixed spectrum allocation system in the traditional sense, and dynamically allocates the spectrums between systems, improving the efficiency of spectrum utilization. Studies found that the spectrum resources of the broadcast television system have room of availability to a large extent, for example, some radio spectrums of the broadcast television system have not been used in some areas; although some spectrums of the broadcast television system have covered some areas, but are not used in some moments, the overall utilization is relatively low. The fixed spectrum allocation mode makes the abovementioned unused spectrum resources unable to be reused, for example, the resources cannot be used by the International Mobile Telecom (IMT) system. The cognitive radio technology solves this problem, that is, the IMT system opportunistically occupies the unused TV White Space (TVWS) in space and time of the broadcast and TV system by obtaining information of the broadcast and television system with the cognitive radio technology, thereby improving the spectrum (authorized spectrum) utilization of the broadcast and television system and releasing the shortage of spectrums in the IMT system.

The cognitive radio system can "opportunistically" use the channels (namely the TVWS) which the primary user (television broadcasting system) does not use at specific times and locations. Therefore, the TVWS spectrums which the cognitive radio system can use are constantly changing, for example, due to the arrival of the primary user (that is, the primary user re-occupies the TVWS) or other reasons, the cognitive radio system must exit from the TVWS spectrum currently in use, or is re-allocated with other TVWS spectrums (that is, exit from the TVWS spectrums currently in use, and be reconfigured with other TVWS spectrums), and the reconfiguration delay may also cause interruptions in the user equipment (UE) service.

The handover technology is one of the key technologies of the mobile communication system, a good handover algorithm can provide the user who has a handover calling request with more efficient and reliable handover service between two adjacent base stations, thereby providing system communication quality and system capacity. The serving cell of the user equipment before the handover is called a source cell, the base station to which the source cell belongs is called a source base station; the cell to which the user equipment prepares to hand over (i.e. the cell that becomes the serving cell of the user equipment after a successful handover) is called a target cell, and the base station to which the target cell belongs is the target base station.

Typically, the handover determination technology applied in the communication system (such as the LTE) is mainly that: the UE measures the signal strength and signal quality of the source cell and adjacent cells, and reports the measurement result to the base station to which the source cell belongs; the base station to which the source cell belongs judges whether to trigger a handover or not in accordance with the preset threshold, and selects a target cell based on the measurement result of the UE; the case that the target cell is a cell (such as a cell using the TVWS spectrums) in the cognitive radio system is not considered in the handover process in the related art. When the target cell is a cell in the cognitive radio system (such as a cell using the TVWS spectrums or spectrums authorized to other systems), and there will be the following problems if the handover determination method in the related art is still used:

1. in a UE handover process, a spectrum resource reconfiguration occurs in the target cell, for example, reconfigured from the TVWS spectrum f1 to f2, at this point, if the UE does not know that the spectrum resources of the target cell are changed, the UE cannot find the target cell determined previously, resulting in a handover failure, and even if the UE is informed of the change of spectrum resources in the target cell, the frequency point f1 measurement result of the target cell and the handover decision are also invalid due to the change of the frequency point, that is, the f2 may not be suitable for the UE handover, which may also cause a handover failure;

2. shortly after the UE hands over to the target cell, a spectrum resource reconfiguration occurs in the target cell, the UE also will be reconfigured, and the UE's service will be affected by the reconfiguration delay, if the reconfiguration time of the target cell is too long, it may result in interruptions in the UE's service;

3. when the base station to which the source cell belongs selects a target cell, it does not consider the spectrum properties of the target cell, specifically, whether the target cell is a cell using the TVWS spectrums or the spectrums authorized to other radio access technology cell communication systems or not is not taken into account, but by default the target cell uses the authorized spectrums; since the TVWS spectrum cell may have spectrum resource reconfigurations, it will lead to an increase in the number of UE handovers.

SUMMARY

To solve the technical problem, the present document provides a method and apparatus for controlling a handover in a cognitive radio system, to control a cell handover process of a user equipment, and to hand over the user equipment to an appropriate target cell as far as possible.

To solve the abovementioned technical problem, the present document provides a method for controlling a handover in a cognitive radio system, comprising:

a source base station receiving a measurement report sent by a user equipment;

the source base station controlling a handover of the user equipment according to the measurement report, radio resource management information, and reconfiguration related information.

Preferably, the source base station controlling a handover of the user equipment according to the measurement report, the radio resource management information and the reconfiguration related information comprises:

the source base station determining a candidate target cell according to the measurement report and the radio resource management information, and controlling the handover of the user equipment according to the reconfiguration related information of the candidate target cell.

Preferably, the reconfiguration related information comprises one or more of the following contents: spectrum valid time, reconfiguration delay, and an average number of reconfigurations; wherein: the spectrum valid time refers to a length of a time from a current time point to a time point at which a current cell exits from a current operating spectrum; the reconfiguration delay refers to a time needed by the current cell to complete a reconfiguration process; the average number of reconfigurations refers to a number of reconfigurations in a preset period of time; wherein, the reconfiguration related information of the candidate target cell is obtained by the source base station from a base station to which the candidate target cell belongs.

Preferably, said controlling the handover of the user equipment according to the reconfiguration related information of the candidate target cell comprises:

judging whether the spectrum valid time of the candidate target cell is greater than a spectrum valid time threshold or not, when the spectrum valid time of the candidate target cell is greater than the spectrum valid time threshold, the source base station selecting the candidate target cell as a target cell of the handover, and sending a handover request message to a base station to which the target cell belongs, so as to complete the handover of the user equipment to the target cell; or judging whether the reconfiguration delay of the candidate target cell is less than a reconfiguration delay threshold required by a service of the user equipment or not, when the reconfiguration delay of the candidate target cell is less than the reconfiguration delay threshold required by the service of the user equipment, the source base station selecting the candidate target cell as a target cell of the handover, and sending a handover request message to a base station to which the target cell belongs, so as to complete the handover of the user equipment to the target cell; or judging whether the average number of reconfigurations of the candidate target cell is less than a threshold of the average number of the reconfigurations or not, when the average number of reconfigurations of the candidate target cell is less than the threshold of the average number of reconfigurations, the source base station selecting the candidate target cell as a target cell of the handover, and sending a handover request message to a base station to which the target cell belongs, so as to complete the handover of the user equipment to the target cell; or judging whether the spectrum valid time of the candidate target cell is greater than a spectrum valid time threshold or not, when the spectrum valid time of the candidate target cell is greater than the spectrum valid time threshold, judging whether the reconfiguration delay of the candidate target cell is less than a reconfiguration delay threshold required by a service of the user equipment or not, when the reconfiguration delay of the candidate target cell is less than the reconfiguration delay threshold required by the service of the user equipment, the source base station selecting the candidate target cell as a target cell of the handover, and sending a handover request message to a base station to which the target cell belongs, so as to complete the handover of the user equipment to the target cell; or judging whether the spectrum valid time of the candidate target cell is greater than a spectrum valid time threshold or not, when the spectrum valid time of the candidate target cell is greater than the spectrum valid time threshold, judging whether the average number of reconfigurations of the candidate target cell is less than a threshold of the average number of reconfigurations or not, when the average number of reconfigurations of the candidate target cell is less than the threshold of the average number of reconfigurations, the source base station selecting the candidate target cell as a target cell of the handover, and sending a handover request message to a base station to which the target cell belongs, so as to complete the handover of the user equipment to the target cell; or judging whether the reconfiguration delay of the candidate target cell is less than a reconfiguration delay threshold required by a service of the user equipment or not, when the reconfiguration delay of the candidate target cell is less than the reconfiguration delay threshold required by the service of the user equipment, judging whether the average number of reconfigurations of the candidate target cell is less than a threshold of the average number of reconfigurations or not, when the average number of reconfigurations of the candidate target cell is less than the threshold of the average number of reconfigurations, the source base station selecting the candidate target cell as a target cell of the handover, and sending a handover request message to a base station to which the target cell belongs, so as to complete the handover of the user equipment to the target cell; or judging whether the spectrum valid time of the candidate target cell is greater than a spectrum valid time threshold or not, when the spectrum valid time of the candidate target cell is greater than the spectrum valid time threshold, judging whether the reconfiguration delay of the candidate target cell is less than a reconfiguration delay threshold required by a service of the user equipment or not, when the reconfiguration delay of the candidate target cell is less than the reconfiguration delay threshold required by the service of the user equipment, judging whether the average number of reconfigurations of the candidate target cell is less than a threshold of the average number of reconfigurations or not, when the average number of reconfigurations of the candidate target cell is less than the threshold of the average number of reconfigurations, the source base station selecting the candidate target cell as a target cell of the handover, and sending a handover request message to a base station to which the target cell belongs, so as to complete the handover of the user equipment to the target cell.

To solve the abovementioned technical problem, the present document further provides a method for controlling a handover in a cognitive radio system, comprising:

a source base station receiving a measurement report sent by a user equipment;

the source base station sending a handover request message to a target base station according to the measurement report and radio resource management information;

after receiving the handover request message, the target base station controlling a handover of the user equipment according to reconfiguration related information of the target cell.

Preferably, the reconfiguration related information comprises one or more of the following contents: spectrum valid time, reconfiguration delay, and an average number of reconfigurations; wherein: the spectrum valid time refers to a length of a time from a current time point to a time point at which a current cell exits from a current operating spectrum; the reconfiguration delay refers to a time needed by the current cell to complete a reconfiguration process; the average number of reconfigurations refers to a number of reconfigurations in a preset period of time.

Preferably, said controlling a handover of the user equipment according to reconfiguration related information of the target cell comprises:

judging whether the spectrum valid time of the target cell is greater than a spectrum valid time threshold or not, when the spectrum valid time of the target cell is greater than the spectrum valid time threshold, performing admission control on the user equipment, so as to complete the handover of the user equipment to the target cell; or judging whether the reconfiguration delay of the target cell is less than a reconfiguration delay threshold required by a service of the user equipment or not, when the reconfiguration delay of the target cell is less than the reconfiguration delay threshold required by the service of the user equipment, performing admission control on the user equipment, so as to complete the handover of the user equipment to the target cell; or judging whether the average number of reconfigurations of the target cell is less than a threshold of the average number of the reconfigurations or not, when the average number of reconfigurations of the target cell is less than the threshold of the average number of reconfigurations, performing admission control on the user equipment, so as to complete the handover of the user equipment to the target cell; or judging whether the spectrum valid time of the target cell is greater than a spectrum valid time threshold or not, when the spectrum valid time of the target cell is greater than the spectrum valid time threshold, judging whether the reconfiguration delay of the target cell is less than a reconfiguration delay threshold required by a service of the user equipment or not, when the reconfiguration delay of the target cell is less than a reconfiguration delay threshold required by the service of the user equipment, performing admission control on the user equipment, so as to complete the handover of the user equipment to the target cell; or judging whether the spectrum valid time of the target cell is greater than a spectrum valid time threshold or not, when the spectrum valid time of the target cell is greater than the spectrum valid time threshold, judging whether the average number of reconfigurations of the target cell is less than a threshold of the average number of reconfigurations or not, when the average number of reconfigurations of the target cell is less than the threshold of the average number of reconfigurations, performing admission control on the user equipment, so as to complete the handover of the user equipment to the target cell; or judging whether the reconfiguration delay of the target cell is less than a reconfiguration delay threshold required by a service of the user equipment or not, when the reconfiguration delay of the target cell is less than a reconfiguration delay threshold required by the service of the user equipment, judging whether the average number of reconfigurations of the target cell is less than a threshold of the average number of reconfigurations or not, when the average number of reconfigurations of the target cell is less than the threshold of the average number of reconfigurations, performing admission control on the user equipment, so as to complete the handover of the user equipment to the target cell; or judging whether the spectrum valid time of the target cell is greater than a spectrum valid time threshold or not, when the spectrum valid time of the target cell is greater than the spectrum valid time threshold, judging whether the reconfiguration delay of the target cell is less than a reconfiguration delay threshold required by a service of the user equipment or not, when the reconfiguration delay of the target cell is less than the reconfiguration delay threshold required by the service of the user equipment, judging whether the average number of reconfigurations of the target cell is less than a threshold of the average number of reconfigurations or not, when the average number of reconfigurations of the candidate target cell is less than the threshold of the average number of reconfigurations, performing admission control on the user equipment, so as to complete the handover of the user equipment to the target cell.

To solve the abovementioned technical problem, the present document further provides an apparatus for controlling a handover in a cognitive radio system, the apparatus is located in a source base station and comprises a receiving module and a handover controlling module, wherein:

the receiving module is configured to receive a measurement report sent by a user equipment;

the handover controlling module is configured to control a handover of the user equipment according to the measurement report, radio resource management information, and reconfiguration related information.

Preferably, the handover controlling module comprises a candidate target cell determining unit and a handover controlling unit, wherein:

the candidate target cell determining unit is configured to determine a candidate target cell according to the measurement report and the radio resource management information;

the handover controlling unit is configured to control the handover of the user equipment according to the reconfiguration related information of the candidate target cell.

Preferably, the reconfiguration related information comprises one or more of the following contents: spectrum valid time, reconfiguration delay, and an average number of reconfigurations; wherein: the spectrum valid time refers to a length of a time from a current time point to a time point at which a current cell exits from a current operating spectrum; the reconfiguration delay refers to a time needed by the current cell to complete a reconfiguration process; the average number of reconfigurations refers to a number of reconfigurations in a preset period of time; wherein, the reconfiguration related information of the candidate target cell is obtained by the source base station from a base station to which the candidate target cell belongs.

Preferably, the handover controlling unit being configured to control the handover of the user equipment according to the reconfiguration related information of the candidate target cell, comprises:

the handover controlling unit judging whether the spectrum valid time of the candidate target cell is greater than a spectrum valid time threshold or not, when the spectrum valid time of the candidate target cell is greater than the spectrum valid time threshold, the source base station selecting the candidate target cell as a target cell of the handover, and sending a handover request message to a base station to which the target cell belongs, so as to complete the handover of the user equipment to the target cell; or the handover controlling unit judging whether the reconfiguration delay of the candidate target cell is less than a reconfiguration delay threshold required by a service of the user equipment or not, when the reconfiguration delay of the candidate target cell is less than the reconfiguration delay threshold required by the service of the user equipment, the handover controlling unit selecting the candidate target cell as a target cell of the handover, and sending a handover request message to a base station to which the target cell belongs, so as to complete the handover of the user equipment to the target cell; or the handover controlling unit judging whether the average number of reconfigurations of the candidate target cell is less than a threshold of the average number of the reconfigurations or not, when the average number of reconfigurations of the candidate target cell is less than the threshold of the average number of reconfigurations, the handover controlling unit selecting the candidate target cell as a target cell of the handover, and sending a handover request message to a base station to which the target cell belongs, so as to complete the handover of the user equipment to the target cell; or the handover controlling unit judging whether the spectrum valid time of the candidate target cell is greater than a spectrum valid time threshold or not, when the spectrum valid time of the candidate target cell is greater than the spectrum valid time threshold, judging whether the reconfiguration delay of the candidate target cell is less than a reconfiguration delay threshold required by a service of the user equipment or not, when the reconfiguration delay of the candidate target cell is less than the reconfiguration delay threshold required by the service of the user equipment, the handover controlling unit selecting the candidate target cell as a target cell of the handover, and sending a handover request message to a base station to which the target cell belongs, so as to complete the handover of the user equipment to the target cell;

or the handover controlling unit judging whether the spectrum valid time of the candidate target cell is greater than a spectrum valid time threshold or not, when the spectrum valid time of the candidate target cell is greater than the spectrum valid time threshold, judging whether the average number of reconfigurations of the candidate target cell is less than a threshold of the average number of reconfigurations or not, when the average number of reconfigurations of the candidate target cell is less than the threshold of the average number of reconfigurations, the handover controlling unit selecting the candidate target cell as a target cell of the handover, and sending a handover request message to a base station to which the target cell belongs, so as to complete the handover of the user equipment to the target cell; or the handover controlling unit judging whether the reconfiguration delay of the candidate target cell is less than a reconfiguration delay threshold required by a service of the user equipment or not, when the reconfiguration delay of the candidate target cell is less than the reconfiguration delay threshold required by the service of the user equipment, judging whether the average number of reconfigurations of the candidate target cell is less than a threshold of the average number of reconfigurations or not, when the average number of reconfigurations of the candidate target cell is less than the threshold of the average number of reconfigurations, the handover controlling unit selecting the candidate target cell as a target cell of the handover, and sending a handover request message to a base station to which the target cell belongs, so as to complete the handover of the user equipment to the target cell; or the handover controlling unit judging whether the spectrum valid time of the candidate target cell is greater than a spectrum valid time threshold or not, when the spectrum valid time of the candidate target cell is greater than the spectrum valid time threshold, judging whether the reconfiguration delay of the candidate target cell is less than a reconfiguration delay threshold required by a service of the user equipment or not, when the reconfiguration delay of the candidate target cell is less than the reconfiguration delay threshold required by the service of the user equipment, judging whether the average number of reconfigurations of the candidate target cell is less than a threshold of the average number of reconfigurations or not, when the average number of reconfigurations of the candidate target cell is less than the threshold of the average number of reconfigurations, the handover controlling unit selecting the candidate target cell as a target cell of the handover, and sending a handover request message to a base station to which the target cell belongs, so as to complete the handover of the user equipment to the target cell.

To solve the abovementioned technical problem, the present document further provides an apparatus for controlling a handover in a cognitive radio system, the apparatus is located in a base station and comprises a source base station processing module and a target base station processing module, wherein:

the source base station processing module is configured to: when the base station is a source base station, receive a measurement report sent by a user equipment, determine a target cell according to the measurement report and radio resource management information, and send a handover request message to a target base station;

the target base station processing module is configured to: when the base station is a target base station, after receiving a handover request message, control a handover of a user equipment according to reconfiguration related information of a target cell.

Preferably, the reconfiguration related information comprises one or more of the following contents: spectrum valid time, reconfiguration delay, and an average number of reconfigurations; wherein: the spectrum valid time refers to a length of a time from a current time point to a time point at which a current cell exits from a current operating spectrum; the reconfiguration delay refers to a time needed by the current cell to complete a reconfiguration process; the average number of reconfigurations refers to a number of reconfigurations in a preset period of time.

Preferably, the target base station processing module being configured to control a handover of a user equipment according to reconfiguration related information of a target cell, comprises:

the target base station processing module judging whether the spectrum valid time of the target cell is greater than a spectrum valid time threshold or not, when the spectrum valid time of the target cell is greater than the spectrum valid time threshold, performing admission control on the user equipment, so as to complete the handover of the user equipment to the target cell; or the target base station processing module judging whether the reconfiguration delay of the target cell is less than a reconfiguration delay threshold required by a service of the user equipment or not, when the reconfiguration delay of the target cell is less than the reconfiguration delay threshold required by the service of the user equipment, performing admission control on the user equipment, so as to complete the handover of the user equipment to the target cell; or the target base station processing module judging whether the average number of reconfigurations of the target cell is less than a threshold of the average number of the reconfigurations or not, when the average number of reconfigurations of the target cell is less than the threshold of the average number of reconfigurations, performing admission control on the user equipment, so as to complete the handover of the user equipment to the target cell; or the target base station processing module judging whether the spectrum valid time of the target cell is greater than a spectrum valid time threshold or not, when the spectrum valid time of the target cell is greater than the spectrum valid time threshold, judging whether the reconfiguration delay of the target cell is less than a reconfiguration delay threshold required by a service of the user equipment or not, when the reconfiguration delay of the target cell is less than the reconfiguration delay threshold required by the service of the user equipment, performing admission control on the user equipment, so as to complete the handover of the user equipment to the target cell; or the target base station processing module judging whether the spectrum valid time of the target cell is greater than a spectrum valid time threshold or not, when the spectrum valid time of the target cell is greater than the spectrum valid time threshold, judging whether the average number of reconfigurations of the target cell is less than a threshold of the average number of reconfigurations or not, when the average number of reconfigurations of the target cell is less than the threshold of the average number of reconfigurations, performing admission control on the user equipment, so as to complete the handover of the user equipment to the target cell; or the target base station processing module judging whether the reconfiguration delay of the target cell is less than a reconfiguration delay threshold required by a service of the user equipment or not, when the reconfiguration delay of the target cell is less than the reconfiguration delay threshold required by the service of the user equipment, judging whether the average number of reconfigurations of the target cell is less than a threshold of the average number of reconfigurations or not, when the average number of reconfigurations of the target cell is less than the threshold of the average number of reconfigurations, performing admission control on the user equipment, so as to complete the handover of the user equipment to the target cell; or the target base station processing module judging whether the spectrum valid time of the target cell is greater than a spectrum valid time threshold or not, when the spectrum valid time of the target cell is greater than the spectrum valid time threshold, judging whether the reconfiguration delay of the target cell is less than a reconfiguration delay threshold required by a service of the user equipment or not, when the reconfiguration delay of the target cell is less than the reconfiguration delay threshold required by the service of the user equipment, judging whether the average number of reconfigurations of the target cell is less than a threshold of the average number of reconfigurations or not, when the average number of reconfigurations of the candidate target cell is less than the threshold of the average number of reconfigurations, performing admission control on the user equipment, so as to complete the handover of the user equipment to the target cell.

Using the technical scheme of the present application to control the cell handover process of the user equipment can hand over the user equipment to the appropriate target cell as far as possible, and specifically address the problem of handover failure due to the spectrum resource reconfiguration occurred in the target cell during a UE handover process, as well as the problem of interruptions in the UE service and frequent handovers due to the spectrum resource reconfiguration occurred in the target cell after the UE hands over to the target cell.

BRIEF DESCRIPTION OF THE DRAWINGS

The accompanying drawings described herein are used to provide a further understanding of the present document and constitute a part of the present application, the exemplary embodiments of the present document and their descriptions are used to explain the present document, and do not constitute an improper limitation on the present document. In the accompanying drawings.

PREFERRED EMBODIMENTS OF THE INVENTION

Hereinafter in conjunction with the accompanying drawings, the embodiments of the present document will be described in detail. It should be noted that, in the case of no conflict, the embodiments and features in the embodiments of the present application may be arbitrarily combined with each other.

The First Embodiment

Figure 1:
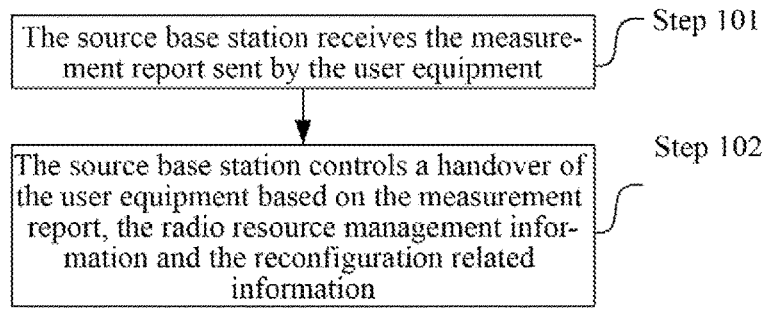
FIG. 1 is a flow chart of a method for a source base station controlling a handover in accordance with a first embodiment of the present document.

The present embodiment describes a method for controlling a handover implemented by the source base station, and the process is shown in FIG. 1, and comprises:

In step 101, the source base station receives the measurement report sent by the user equipment;

before this, the process further comprises that, the user equipment measures in accordance with the measurement configuration of the base station (source base station), and then in accordance with the measurement result reporting mode in the measurement configuration, reports the measurement result to the base station, and these processes are the related art and are no longer repeated here.

In Step 102, the source base station controls a handover of the user equipment according to the measurement report, the radio resource management information and the reconfiguration related information.

Specifically, the source base station determines a candidate target cell according to the measurement report and the radio resource management information, and controls a handover of the user equipment according to the reconfiguration related information of the candidate target cell.

The abovementioned reconfiguration related information comprises one or more of the following contents: spectrum valid time, reconfiguration delay, the average number of reconfigurations; wherein:

the spectrum valid time refers to the length of the time from the current time point to the time point at which the current cell exits from the current operating spectrum; in particular, the time point when exiting from the current operating spectrum can be obtained at the same time when the base station to which the cell belongs obtains the spectrum from the database, or can be obtained by the base station to which the cell belongs according to the statistical prediction of the perceptive result of the spectrum, or also can be set by the administrator during the radio resource optimization;

the reconfiguration delay refers to the time needed by the current cell from the beginning of the resource reconfiguration to the completion of the reconfiguration, that is, the time needed by the current cell to complete the reconfiguration process, and it may be a statistical value obtained according to the previous reconfiguration delay;

the average number of reconfigurations refers to the number of reconfigurations within a preset period of time, it can be obtained according to the statistics regularity of the number of previous reconfigurations in the current cell, for example, the number of reconfigurations within the past 24 hours;

according to different contents of the reconfiguration related information, the handover control performed by the source base station according to the reconfiguration related information also varies, and it will be specifically described below:

in scene 1, when the reconfiguration related information comprises only the spectrum valid time, after determining a candidate target cell based on the measurement report and the radio resource management information according to the related art, the source base station judges whether the spectrum valid time of the candidate target cell is greater than a spectrum valid time threshold or not, when the spectrum valid time of the candidate target cell is greater than the spectrum valid time threshold, the source base station selects the candidate target cell as a target cell of the handover, and sends a handover request message to the base station to which the target cell belongs, then executes the procedure specified in the existing protocol, to complete the handover of the user equipment to the target cell; by referring to the spectrum valid time during the handover, it can be ensured that no reconfiguration occurs in the target cell in the process of the user equipment handing over to the target cell, that is, it ensures that the user equipment completes the handover before the reconfiguration in the target cell, thus avoiding a handover failure;

in scene 2, when the reconfiguration related information only comprises the reconfiguration delay, after determining a candidate target cell based on the measurement report and the radio resource management information according to the related art, the source base station judges whether the reconfiguration delay of the candidate target cell is less than a reconfiguration delay threshold required by the service of the user equipment or not, when the reconfiguration delay of the candidate target cell is less than the reconfiguration delay threshold required by the service of the user equipment, the source base station selects the candidate target cell as a target cell of the handover, and sends a handover request message to the base station to which the target cell belongs, then executes the procedure specified in the existing protocol to complete the handover of the user equipment to the target cell; by referring to the reconfiguration delay during the handover, it can be ensured that after the user equipment hands over to the target cell, the reconfiguration delay of the target cell will not lead to interruptions in the service of the user equipment;

in scene 3, when the reconfiguration related information only comprises the average number of reconfigurations, after determining a candidate target cell based on the measurement report and the radio resource management information according to the related art, the source base station judges whether the average number of reconfigurations of the candidate target cell is less than a threshold of the average number of the reconfigurations or not, when the average number of reconfigurations of the candidate target cell is less than the threshold of the average number of reconfigurations, the source base station selects the candidate target cell as a target cell of the handover, and sends a handover request message to the base station to which the target cell belongs, to complete the handover of the user equipment to the target cell; by referring to the average number of reconfigurations during the handover, it can be ensured that after the user equipment hands over to the target cell, the handover frequency (reconfiguration frequency) of the user equipment is not too high, that is, the handover frequency is reduced;

in scene 4, when the reconfiguration related information comprises the spectrum valid time and the reconfiguration delay, after determining a candidate target cell based on the measurement report and the radio resource management information according to the related art, the source base station judges whether the spectrum valid time of the candidate target cell is greater than a spectrum valid time threshold or not, when the spectrum valid time of the candidate target cell is greater than the spectrum valid time threshold, further judges whether the reconfiguration delay of the candidate target cell is less than a reconfiguration delay threshold required by the service of the user equipment or not, when the reconfiguration delay of the candidate target cell is less than a reconfiguration delay threshold required by the service of the user equipment, the source base station selects the candidate target cell as a target cell of the handover, and sends a handover request message to the base station to which the target cell belongs, then executes the procedure specified in the existing protocol, to complete the handover of the user equipment to the target cell;

in scene 5, when the reconfiguration related information comprises the spectrum valid time and the average number of reconfigurations, after determining a candidate target cell based on the measurement report and the radio resource management information according to the related art, the source base station judges whether the spectrum valid time of the candidate target cell is greater than a spectrum valid time threshold or not, when the spectrum valid time of the candidate target cell is greater than the spectrum valid time threshold, further judges whether the average number of reconfigurations of the candidate target cell is less than a threshold of the average number of reconfigurations or not, when the average number of reconfigurations of the candidate target cell is less than the threshold of the average number of reconfigurations, the source base station selects the candidate target cell as a target cell of the handover, and sends a handover request message to the base station to which the target cell belongs, then executes the procedure specified in the existing protocol to complete the handover of the user equipment to the target cell;

in scene 6, when the reconfiguration related information comprises the reconfiguration delay and the average number of reconfigurations, after determining a candidate target cell based on the measurement report and the radio resource management information according to the related art, the source base station judges whether the reconfiguration delay of the candidate target cell is less than a reconfiguration delay threshold required by the service of the user equipment or not, when the reconfiguration delay of the candidate target cell is less than the reconfiguration delay threshold required by the service of the user equipment, further judges whether the average number of reconfigurations of the candidate target cell is less than a threshold of the average number of reconfigurations or not, when the average number of reconfigurations of the candidate target cell is less than the threshold of the average number of reconfigurations, the source base station selects the candidate target cell as a target cell of the handover, and sends a handover request message to the base station to which the target cell belongs, then executes the procedure specified in the existing protocol to complete the handover of the user equipment to the target cell;

in scene 7, when the reconfiguration related information comprises the spectrum valid time, the reconfiguration delay and the average number of reconfigurations, after determining a candidate target cell based on the measurement report and the radio resource management information according to the related art, the source base station judges whether the spectrum valid time of the candidate target cell is greater than a spectrum valid time threshold or not, when the spectrum valid time of the candidate target cell is greater than the spectrum valid time threshold, the source base station further judges whether the reconfiguration delay of the candidate target cell is less than a reconfiguration delay threshold required by the service of the user equipment or not, when the reconfiguration delay of the candidate target cell is less than the reconfiguration delay threshold required by the service of the user equipment, the source base station further judges whether the average number of reconfigurations of the candidate target cell is less than a threshold of the average number of reconfigurations or not, when the average number of reconfigurations of the candidate target cell is less than the threshold of the average number of reconfigurations, the source base station selects the candidate target cell as a target cell of the handover, and sends a handover request message to the base station to which the target cell belongs, then executes the procedure specified in the existing protocol to complete the handover of the user equipment to the target cell.

The content and format of the abovementioned handover request message use the existing technologies and are not repeated here.

The reconfiguration related information of the candidate target cell may be obtained by the source base station from the base station to which the candidate target cell belongs. In addition, if the source base station can obtain the reconfiguration related information of the candidate target cell from the adjacent cell information list maintained by itself, the source base station does not have to obtain this information from the base station to which the candidate target cell belongs.

The abovementioned spectrum valid time threshold, reconfiguration delay threshold and threshold of the average number of reconfigurations may be changed and preset based on the actual situation of the network or the management requirement; in addition, the selection of the reconfiguration delay threshold is related to the service which is executed by the user equipment, for example, if the user equipment is providing a voice service, the reconfiguration delay threshold can be selected as 100 milliseconds; if the user equipment is providing a real-time game service, then the reconfiguration delay threshold can be selected as 50 ms.

Figure 2:
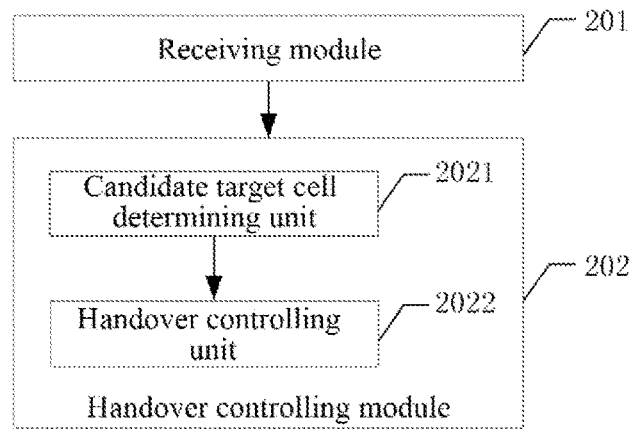
FIG. 2 is a schematic diagram of the structure of an apparatus for controlling a handover in accordance with the first embodiment of the present document.

An apparatus for controlling a handover which implements the abovementioned method and is located in the source base station, as shown in FIG. 2, comprises a receiving module 201 and a handover controlling module 202, wherein:

the receiving module 201 is used to receive a measurement report sent by a user equipment;

the handover controlling module 202 is used to control a handover of the user equipment according to the measurement report, radio resource management information and reconfiguration related information.

In a preferred embodiment, the handover controlling module comprises a candidate target cell determining unit 2021 and a handover controlling unit 2022, wherein:

the candidate target cell determining unit is used to, determine a candidate target cell based on the measurement report and the radio resource management information;

the handover controlling unit is used to control the handover of the user equipment according to the reconfiguration related information of the candidate target cell.

The content of the specific handover control performed by the handover controlling unit on the user equipment can refer to the abovementioned scene 1-scene 7, and is not repeated here.

The Second Embodiment

Figure 3:
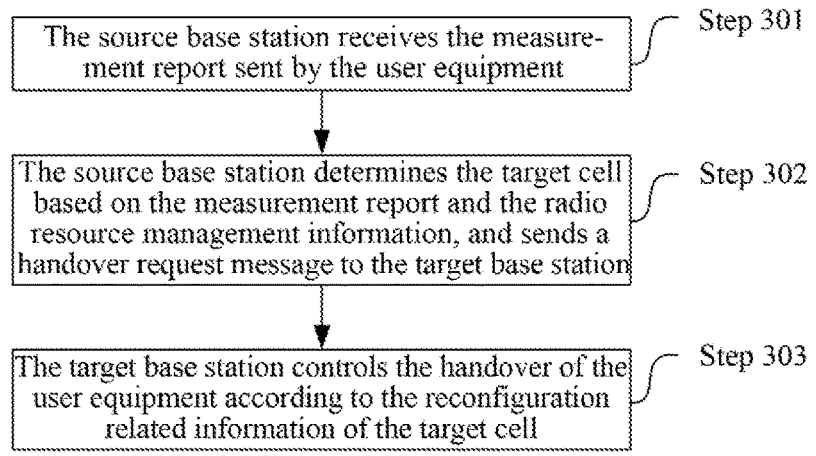
FIG. 3 is a flow chart of the method for a target base station controlling a handover in accordance with a second embodiment of the present document.

The present embodiment describes a method for controlling a handover implemented by the target base station, and the process is shown in FIG. 3, and specifically comprises:

In step 301, the source base station receives the measurement report sent by the user equipment;

In Step 302, the source base station determines the target cell based on the measurement report and the radio resource management information, and sends a handover request message to the target base station;

In step 303, after receiving the handover request message, the target base station controls the handover of the user equipment according to the reconfiguration related information of the target cell.

Refer to the description in the first embodiment for the content included in the abovementioned reconfiguration related information.

According to different contents of the reconfiguration related information, the handover control performed by the target base station depending on the reconfiguration related information also varies, and will be specifically described below:

In scene 1, when the reconfiguration related information only comprises the spectrum valid time, after receiving the handover request message from the source base station, the target base station judges whether the spectrum valid time of the target cell is greater than a spectrum valid time threshold or not, when the spectrum valid time of the target cell is greater than the spectrum valid time threshold, the target base station performs admission control (AC) according to the related art, then executes the procedure specified in the existing protocol to complete the handover of the user equipment to the target cell, and when the determination conditions are not met, the target base station can send a handover preparation failure message to the source base station, after receiving the handover preparation failure message, the source base station processes according to the procedure specified in the existing protocol; by referring to the spectrum valid time during the handover, it can be ensured that no reconfiguration occurs in the target cell in the process of the user equipment handing over to the target cell, that is, it ensures that the user equipment completes the handover before the reconfiguration occurs in the target cell, thus avoiding a handover failure;

In scene 2, when the reconfiguration related information only comprises the reconfiguration delay, after receiving the handover request message from the source base station, the target base station judges whether the reconfiguration delay of the target cell is less than a reconfiguration delay threshold required by the service of the user equipment or not, when the reconfiguration delay of the target cell is less than the reconfiguration delay threshold required by the service of the user equipment, the target base station performs admission control according to the related art, then executes the procedure specified in the existing protocol to complete the handover of the user equipment to the target cell, and when the determination conditions are not met, the target base station can send a handover preparation failure message to the source base station, and the source base station processes according to the procedure specified in the existing protocol after receiving the handover preparation failure message; by referring to the reconfiguration delay during the handover, it can be ensured that the reconfiguration delay of the target cell will not lead to interruptions in the service of the user equipment after the user equipment hands over to the target cell;

In scene 3, when the reconfiguration related information only comprises the average number of reconfigurations, after receiving the handover request message from the source base station, the target base station judges whether the average number of reconfigurations of the target cell is less than a threshold of the average number of reconfigurations or not, when the average number of reconfigurations of the target cell is less than the threshold of the average number of reconfigurations, the target base station performs admission control according to the related art, then executes the procedure specified in the existing protocol to finally complete the handover of the user equipment to the target cell, and when the determination conditions are not met, the target base station can send a handover preparation failure message to the source base station, and the source base station processes according to the procedure specified in the existing protocol after receiving the handover preparation failure message; by referring to the average number of reconfigurations during the handover, it can be ensured that the handover frequency (reconfiguration frequency) of the user equipment is not too high, that is, the handover frequency is reduced, after the user equipment hands over to the target cell;

In scene 4, when the reconfiguration related information comprises the spectrum valid time and the reconfiguration delay, after receiving the handover request message from the source base station, the target base station judges whether the spectrum valid time of the target cell is greater than a spectrum valid time threshold or not, when the spectrum valid time of the target cell is greater than the spectrum valid time threshold, further judges whether the reconfiguration delay of the target cell is less than a reconfiguration delay threshold required by the service of the user equipment or not, when the reconfiguration delay of the target cell is less than the reconfiguration delay threshold required by the service of the user equipment, the target base station performs admission control according to the related art, then executes the procedure specified in the existing protocol to finally complete the handover of the user equipment to the target cell, and when at least one of the above determination conditions is not met, the target base station can send a handover preparation failure message to the source base station, and the source base station processes according to the procedure specified in the existing protocol after receiving the handover preparation failure message;

In scene 5, when the reconfiguration related information comprises the spectrum valid time and the average number of reconfigurations, after receiving the handover request message from the source base station, the target base station judges whether the spectrum valid time of the target cell is greater than a spectrum valid time threshold or not, when the spectrum valid time of the target cell is greater than the spectrum valid time threshold, further judges whether the average number of reconfigurations of the target cell is less than a threshold of the average number of reconfigurations or not, when the average number of reconfigurations of the target cell is less than the threshold of the average number of reconfigurations, the target base station performs admission control according to the related art, then executes the procedure specified in the existing protocol to complete the handover of the user equipment to the target cell, and when at least one of the determination conditions is not met, the target base station can send a handover preparation failure message to the source base station, and the source base station processes according to the procedure specified in the existing protocol after receiving the handover preparation failure message;

In scene 6, when the reconfiguration related information comprises the reconfiguration delay and the average number of reconfigurations, after receiving the handover request message from the source base station, the target base station judges whether the reconfiguration delay of the target cell is less than a reconfiguration delay threshold required by the service of the user equipment or not, when the reconfiguration delay of the target cell is less than the reconfiguration delay threshold required by the service of the user equipment, further judges whether the average number of reconfigurations of the target cell is less than a threshold of the average number of reconfigurations or not, when the average number of reconfigurations of the target cell is less than the threshold of the average number of reconfigurations, the target base station performs admission control according to the related art, then executes the procedure specified in the existing protocol to finally complete the handover of the user equipment to the target cell, and when at least one of the determination conditions is not met, the target base station can send a handover preparation failure message to the source base station, and the source base station processes according to the procedure specified in the existing protocol after receiving the handover preparation failure message;

In scene 7, when the reconfiguration related information comprises the spectrum valid time, the reconfiguration delay and the average number of reconfigurations, after receiving the handover request message from the source base station, the target base station judges whether the spectrum valid time of the target cell is greater than a spectrum valid time threshold or not, when the spectrum valid time of the target cell is greater than the spectrum valid time threshold, further judges whether the reconfiguration delay of the target cell is less than a reconfiguration delay threshold required by the service of the user equipment or not, when the reconfiguration delay of the target cell is less than the reconfiguration delay threshold required by the service of the user equipment, further judges whether the average number of reconfigurations of the target cell is less than a threshold of the average number of reconfigurations or not, when the average number of reconfigurations of the target cell is less than the threshold of the average number of reconfigurations, the target base station performs admission control according to the related art, then executes the procedure specified in the existing protocol to finally complete the handover of the user equipment to the target cell, and when at least one of the determination conditions is not met, the target base station can send a handover preparation failure message to the source base station, and the source base station processes according to the procedure specified in the existing protocol after receiving the handover preparation failure message.

The abovementioned handover preparation failure message comprises the handover failure reasons, including any one or more of the following: the spectrum valid time of the target cell is not met, the reconfiguration delay is not met, and the average number of reconfigurations is not met.

The abovementioned spectrum valid time threshold, reconfiguration delay threshold and threshold of the average number of reconfigurations may be changed and preset based on the actual situation of the network or the management requirement; in addition, the selection of the reconfiguration delay threshold is related to the service which is executed by the user equipment, for example, if the user equipment is providing a voice service, the reconfiguration delay threshold can be selected as 100 milliseconds; if the user equipment is providing a real-time game service, then the reconfiguration delay threshold can be selected as 50 milliseconds.

Figure 4:
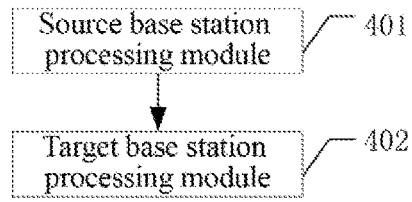
FIG. 4 is a schematic diagram of the structure of an apparatus for controlling a handover in accordance with the second embodiment of the present document.

An apparatus for controlling a handover to realize the abovementioned method, as shown in FIG. 4, is located in the base station and comprises a source base station processing module 401 and a target base station processing module 402. The apparatus for controlling a handover is located in the base station, when the base station works as a source base station, it is lead by the source base station processing module 401, when the base station works as a target base station, it is lead by the target base station processing module 402, for a base station, it may work simultaneously as a source base station and a target base station. In FIG. 4:

the source base station processing module 401 is used to, when the base station works as the source base station, receive the measurement report sent by the user equipment, determine a target cell according to the measurement report and the radio resource management information and send a handover request message to the target base station;

the target base station processing module 402 is used to, when the base station works as the target base station, control the handover of the user equipment based on the reconfiguration related information of the target cell after receiving the handover request message.

The content of the specific handover control performed by the target base station processing module 402 on the user equipment can refer to the abovementioned scene 1-scene 7, and is not repeated here.

In the following, the abovementioned embodiment method will be described in detail with application examples, wherein the handover control is performed by the source base station in the application examples 1-4, and the handover control is performed by the target base station in the application examples 4-8. The following application examples are only used to illustrate some of the scenes, and those skilled in the art can deduce the realization of scenes which are not illustrated in combination with the above embodiments and the following application examples.

In the following application examples, the X2 handover in the LTE system is taken as an example to describe the specific implementation. In the following, the method for controlling a handover follows the auxiliary handover controlling structure for the eNB (enhanced Node Base Station) in the network side in the existing LTE system controlling the UE (User Equipment), while the mobility management entity (MME) is not involved in the handover control but is only responsible for user plane data flow transmission and path transfer.

The First Application Example

Figure 5:
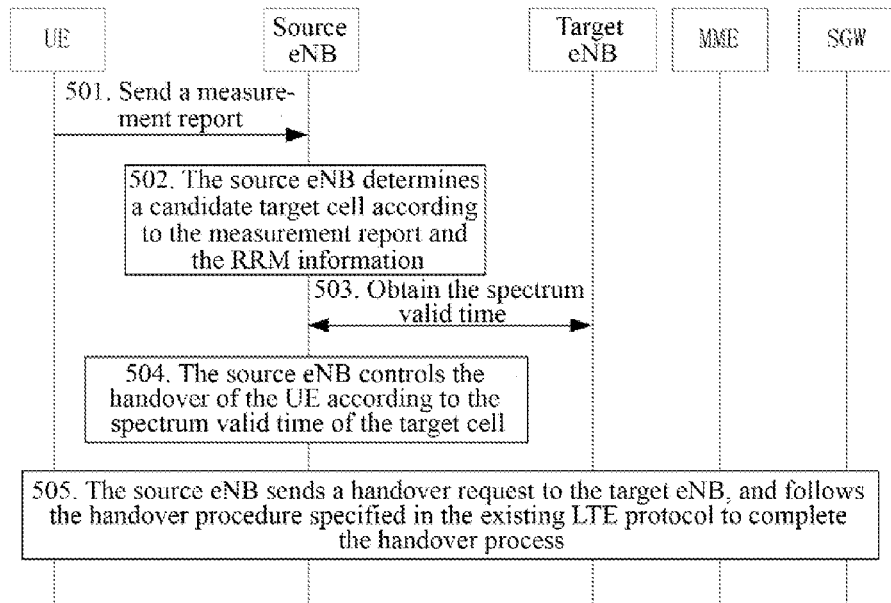
FIG. 5 is a schematic diagram of the process of the source eNB implementing the handover controlling method according to the spectrum valid time of the target cell in accordance with a first application example of the present document.

This example describes the process of the source eNB implementing a handover control according to the spectrum valid time of the target cell, and as shown in FIG. 5, it comprises the following steps:

In step 501, the UE completes the measurement of the specified signals and sends a "MEASUREMENT REPORT" to the source eNB according to the measurement triggering conditions specified in the protocol;

In step 502, the source eNB determines a candidate target cell according to the "Measurement Report" and the radio resource management (RRM) information;

herein, the process of the source base station determining a candidate target cell is the same as the process of the source base station determining a target cell in the related art, and is not repeated here.

In Step 503, the source eNB obtains the spectrum valid time of the candidate target cell from a target eNB to which the candidate target cell belongs;

specifically, the source eNB sends a spectrum valid time request message to the target eNB to which the candidate target cell belongs, the target eNB to which the candidate target cell belongs sends a spectrum valid time response message to the source eNB, wherein the spectrum valid time response message comprises the time point at which the candidate target cell exits from the current operating spectrum, the source eNB needs to calculate out the spectrum valid time of the candidate target cell based on the time point at which the candidate target cell exits from the current operating spectrum, that is, the length of the time of continuously using the current operating spectrum from the current time point to the time point at which the candidate target cell exits from the current operating spectrum;

It is worthy of noting that, if the source eNB can obtain the information of the spectrum valid time of the candidate target cell from the adjacent cell information list maintained by itself, the source eNB does not have to obtain the information from the target eNB to which the candidate target cell belongs, and just obtains this information from the adjacent cell information list directly;

In step 504, the source eNB controls the handover of the UE according to the spectrum valid time of the candidate target cell;

taking the spectrum valid time threshold as 1 minute for example, assuming that the source eNB determines Cell1 as a candidate target cell according to the "Measurement Report" message and the radio resource management information, the spectrum valid time of the TVWS in which the Cell1 is currently operating is 1.5 minutes, at this time the spectrum valid time of the Cell1 is greater than the spectrum valid time threshold value, 1 minute, so that the source eNB selects the Cell1 as the target cell;

in step 505, the source eNB sends a handover request to the target eNB to which the selected target cell belongs, then executes the procedure specified in the existing LTE protocol to finally complete the handover of the user equipment to the target cell.

Herein, the content and format of the handover request message follow the related art and are not repeated here.

The Second Application Example

Figure 6:
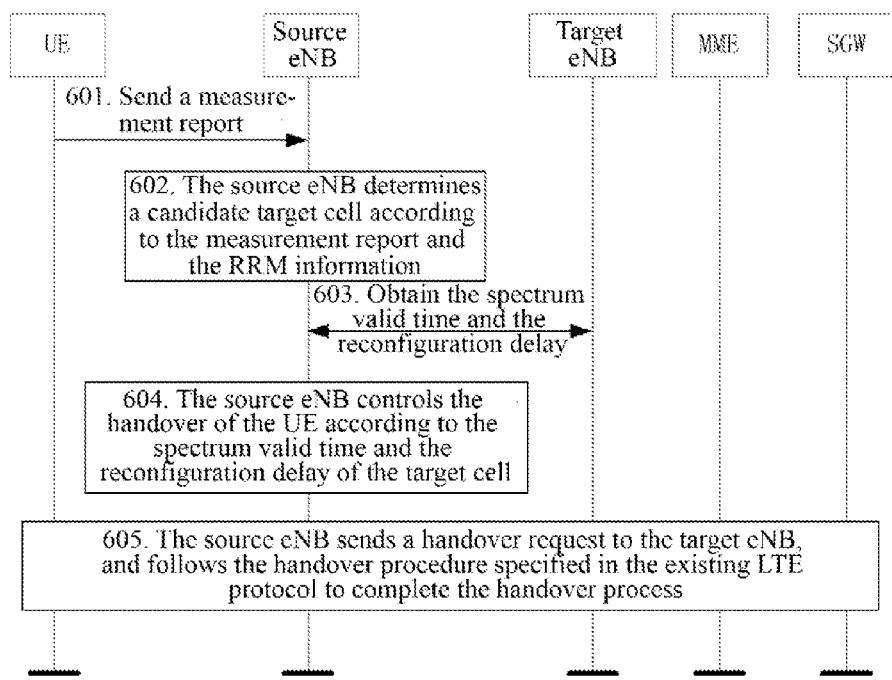
FIG. 6 is a schematic diagram of the process of the source eNB implementing a handover control according to the spectrum valid time and the reconfiguration delay of the target cell in accordance with a second application example of the present document.

The present example describes the process of the source eNB implementing the handover control according to the spectrum valid time and the reconfiguration delay of the target cell. As shown in FIG. 6, it comprises the following steps:

the steps 601-602 are the same as the steps 501-502 and are not repeated here.

In Step 603, the source eNB obtains the spectrum valid time and the reconfiguration delay of the candidate target cell from a target eNB to which the candidate target cell belongs;

specifically, the source eNB sends a handover control information request message to the target eNB to which the candidate target cell belongs, the target eNB to which the candidate target cell belongs sends a handover control information response message to the source eNB, wherein the handover control information response message comprises the time point at which the candidate target cell exits from the current operating spectrum and the reconfiguration delay, the source eNB needs to calculate out the spectrum valid time of the candidate target cell based on the time point at which the candidate target cell exits from the current operating spectrum, that is, the length of the time of continuously using the current operating spectrum from the current time point to the time point at which the candidate target cell exits from its current operating spectrum;

It is worthy of noting that, if the source eNB can obtain the spectrum valid time information and the reconfiguration delay of the candidate target cell from the adjacent cell information list maintained by itself, the source eNB does not have to obtain the information from the target eNB to which the candidate target cell belongs, and just obtains this information from the adjacent cell information list directly;

In step 604, the source eNB controls the handover of the UE according to the spectrum valid time and the reconfiguration delay of the candidate target cell;

taking the spectrum valid time threshold as 1 minute and the reconfiguration delay threshold value as 100 milliseconds (since the UE has a voice service, the reconfiguration delay threshold is selected as 100 ms) for example, assuming that the source eNB determines Cell1 as a candidate target cell according to the "Measurement Report" message and the radio resource management information, the spectrum valid time of the TVWS in which the Cell1 is currently operating is 1.5 minutes, and the reconfiguration delay is 90 milliseconds, at this time the spectrum valid time of the Cell1 is greater than the spectrum valid time threshold, 1 minute, and the reconfiguration delay, 90 milliseconds, is less than the reconfiguration delay threshold 100 milliseconds, the source eNB selects the Cell1 as the target cell;

in step 605, the source eNB sends a handover request to the target eNB to which the selected target cell belongs, then executes the procedure specified in the existing LTE protocol to finally complete the handover of the user equipment to the target cell.

Herein, the content and format of the handover request message follow the related art and are not repeated here.

The Third Application Example

Figure 7:
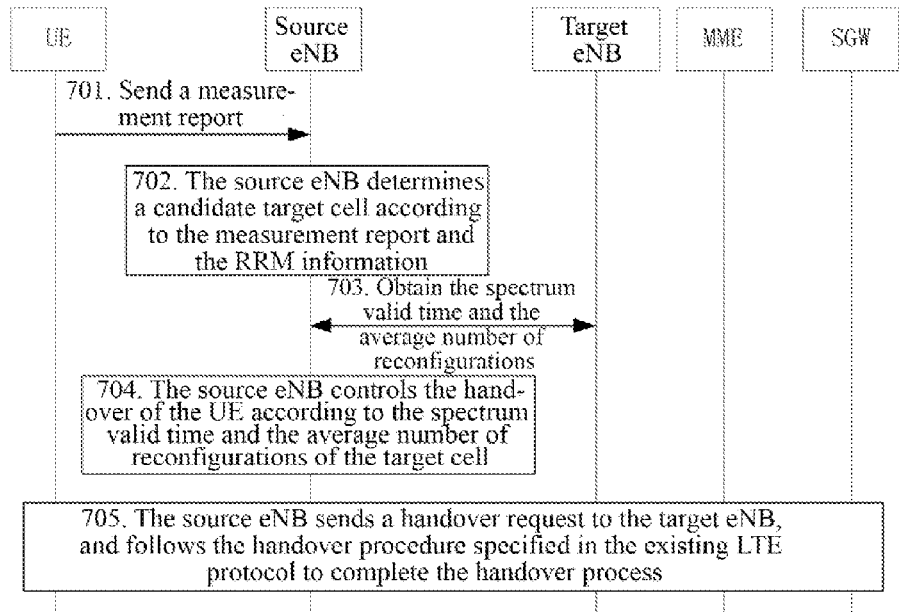
FIG. 7 is a schematic diagram of the process of the source eNB implementing a handover control according to the spectrum valid time and the average number of reconfigurations of the target cell in accordance with a third application example of the present document.

This example describes the process of the source eNB implementing a handover control according to the spectrum valid time and the average number of reconfigurations of the target cell. As shown in FIG. 7, it comprises the following steps:

the steps 701-702 are the same as the steps 501-502 and are not repeated here.

In Step 703, the source eNB obtains the spectrum valid time and the average number of reconfigurations of the candidate target cell from a target eNB to which the candidate target cell belongs;

specifically, the source eNB sends a handover control information request message to the target eNB to which the candidate target cell belongs, the target eNB to which the candidate target cell belongs sends a handover control information response message to the source eNB, wherein the handover control information response message comprises the time point at which the candidate target cell exits from the current operating spectrum and the average number of reconfigurations, the source eNB needs to calculate out the spectrum valid time of the candidate target cell based on the time point at which the candidate target cell exits from the current operating spectrum, that is, the length of the time of continuously using the current operating spectrum from the current time point to the time point at which the candidate target cell exits from its current operating spectrum;

it is worthy of noting that, if the source eNB can obtain the information of the spectrum valid time and the average number of reconfigurations of the candidate target cell from the adjacent cell information list maintained by itself, the source eNB does not have to obtain the information from the target eNB to which the candidate target cell belongs, and just obtains this information from the adjacent cell information list directly;

in step 704, the source eNB controls the handover of the UE according to the spectrum valid time and the average number of reconfigurations of the candidate target cell;

taking the spectrum valid time threshold as 1 minute and the threshold of the average number of reconfigurations as 0.5 times per hour for example, assuming that the source eNB determines Cell1 as the candidate target cell according to the "Measurement Report" message and the radio resource management information, the spectrum valid time of the TVWS in which the Cell1 is currently operating is 1.5 minutes, and the average number of reconfigurations is 0.2 times per hour, when the spectrum valid time of the Cell1 is greater than the spectrum valid time threshold, 1 minute, and the average number of reconfigurations, 0.2 times per hour, is less than the threshold of the average number of reconfigurations, 0.5 times per hour, therefore the source eNB selects the Cell1 as the target cell;

in step 705, the source eNB sends a handover request to the target eNB to which the selected target cell belongs, then executes the handover procedure specified in the existing LTE protocol to finally complete the handover of the user equipment to the target cell.

Herein, the content and format of the handover request message follow the related art and are not repeated here.

The Fourth Application Example

Figure 8:
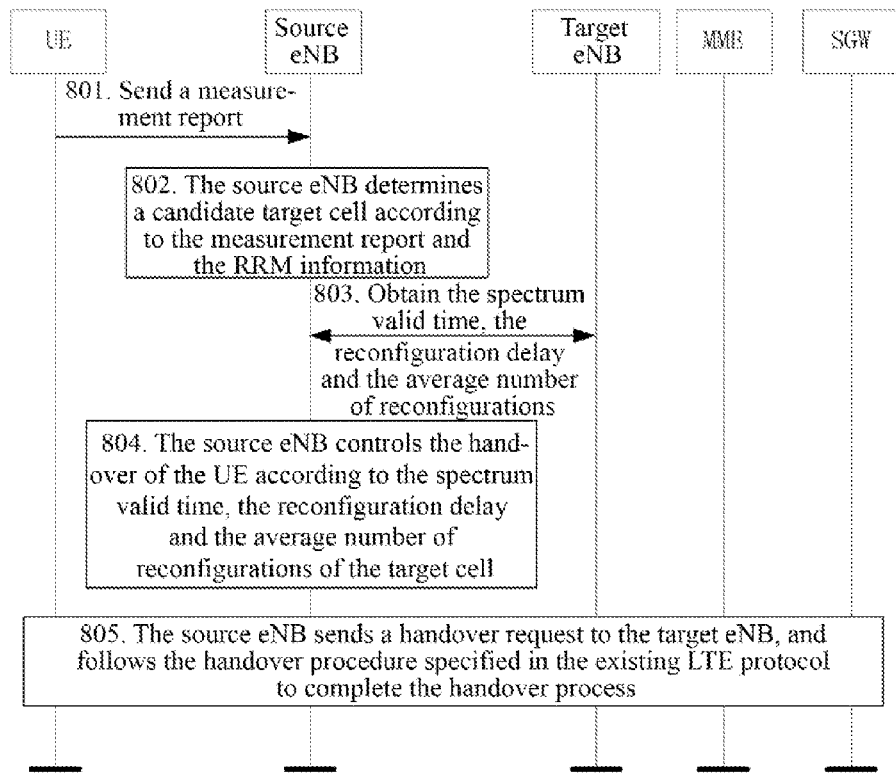
FIG. 8 is a schematic diagram of the process of the source eNB implementing a handover control according to the spectrum valid time, the reconfiguration delay and the average number of reconfigurations of the target cell in accordance with a fourth application example of the present document.

This example describes the process of the source eNB implementing a handover control according to the spectrum valid time, the reconfiguration delay and the average number of reconfigurations of the target cell. As shown in FIG. 8, it comprises the following steps:

the steps 801-802 are the same as the steps 501-502 and are not repeated here.

In Step 803, the source eNB obtains the spectrum valid time, the reconfiguration delay and the average number of reconfigurations of the candidate target cell from a target eNB to which the candidate target cell belongs;

specifically, the source eNB sends a handover control information request message to the target eNB to which the candidate target cell belongs, the target eNB to which the candidate target cell belongs sends a handover control information response message to the source eNB, wherein the handover control information response message comprises the time point at which the candidate target cell exits from the current operating spectrum, the reconfiguration delay and the average number of reconfigurations, and the source eNB needs to calculate out the spectrum valid time of the candidate target cell based on the time point at which the candidate target cell exits from the current operating spectrum, that is, the length of the time of continuously using the current operating spectrum from the current time point to the time point when exiting from its current operating spectrum;

it is worthy of noting that, if the source eNB can obtain information of the spectrum valid time, the reconfiguration delay and the average number of reconfigurations of the candidate target cell from the adjacent cell information list maintained by itself, the source eNB does not have to obtain the information from the target eNB to which the candidate target cell belongs, and obtains the information from the adjacent cell information list directly;

in step 804, the source eNB controls the handover of the UE according to the spectrum valid time, the reconfiguration delay and the average number of reconfigurations of the candidate target cell;

taking the spectrum valid time threshold as 1 minute, the reconfiguration delay threshold as 100 milliseconds, and the threshold of the average number of reconfigurations as 0.5 times per hour for example, assuming that the source eNB determines Cell1 as a candidate target cell according to the "Measurement Report" message and the radio resource management information, the spectrum valid time of the TVWS in which the Cell1 is currently operating is 1.5 minutes, the reconfiguration delay is 90 milliseconds, and the average number of reconfigurations is 0.2 times per hour, at this time, the spectrum valid time of the Cell1 is greater than the spectrum valid time threshold, 1 minute, the reconfiguration delay, 90 milliseconds, is less than the reconfiguration delay threshold value, 100 milliseconds, and the average number of reconfigurations, 0.2 times per hour, is less than the threshold of the average number of reconfigurations, 0.5 times per hour, the source eNB selects the Cell1 as the target cell;

in step 805, the source eNB sends a handover request to the target eNB to which the selected target cell belongs, then executes the handover procedure specified in the existing LTE protocol to finally complete the handover of the user equipment to the target cell.

Herein, the content and format of the handover request message follow the related art and are not repeated here.

The Fifth Application Example

Figure 9:
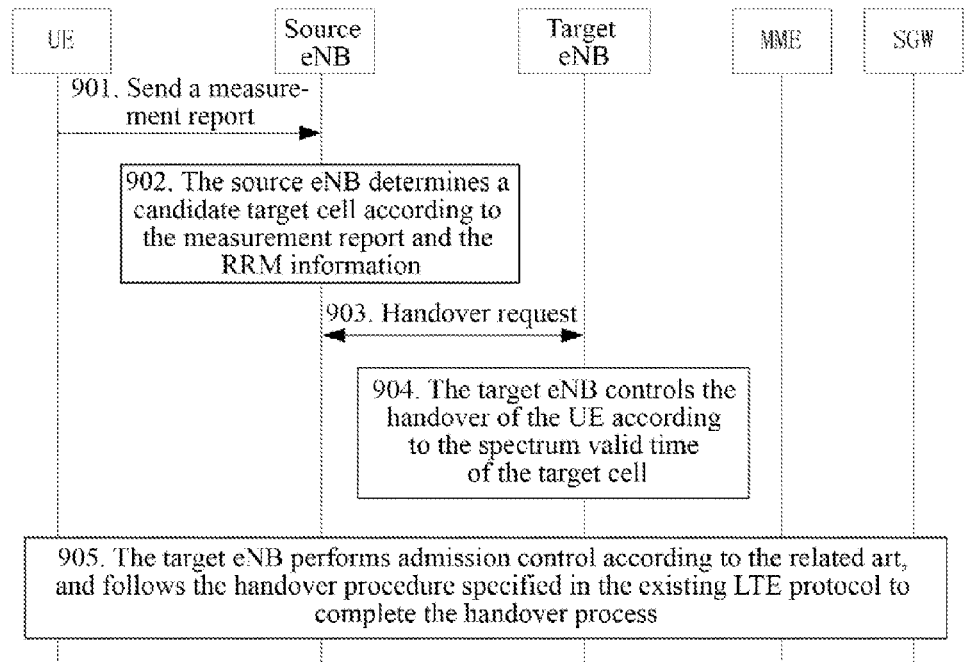
FIG. 9 is a schematic diagram of the process of the target eNB implementing a handover control according to the spectrum valid time of the target cell in accordance with a fifth application example of the present document.

This example describes the process of the target eNB implementing a handover control according to the spectrum valid time of the target cell. As shown in FIG. 9, it comprises the following steps:

the steps 901-902 are the same as the steps 501-502 and are not repeated here.

In Step 903, the source eNB sends a handover request message to a target eNB to which the target cell belongs;

wherein, the content and format of the handover request message follow the related art and are not repeated here.

In step 904, the target eNB controls the handover of the UE according to the spectrum valid time of the target cell after receiving the handover request message from the source eNB;

taking the spectrum valid time threshold as 1 minute for example, assuming that the Cell1 is the target cell, the spectrum valid time of the TVWS in which the Cell1 is currently operating is 1.5 minutes, at this time, the spectrum valid time of the Cell1 is greater than the spectrum valid time threshold value, 1 minute, therefore it can be ensured that no reconfiguration occurs in the target cell in the process of the user equipment handing over to the target cell Cell1, that is, a UE handover failure resulting from the spectrum reconfiguration in the target cell can be avoided;

in step 905, the target eNB performs admission control according to the related art, and then executes the handover procedure specified in the existing LTE protocol to finally complete the handover of the user equipment to the target cell.

The Sixth Application Example

Figure 10:
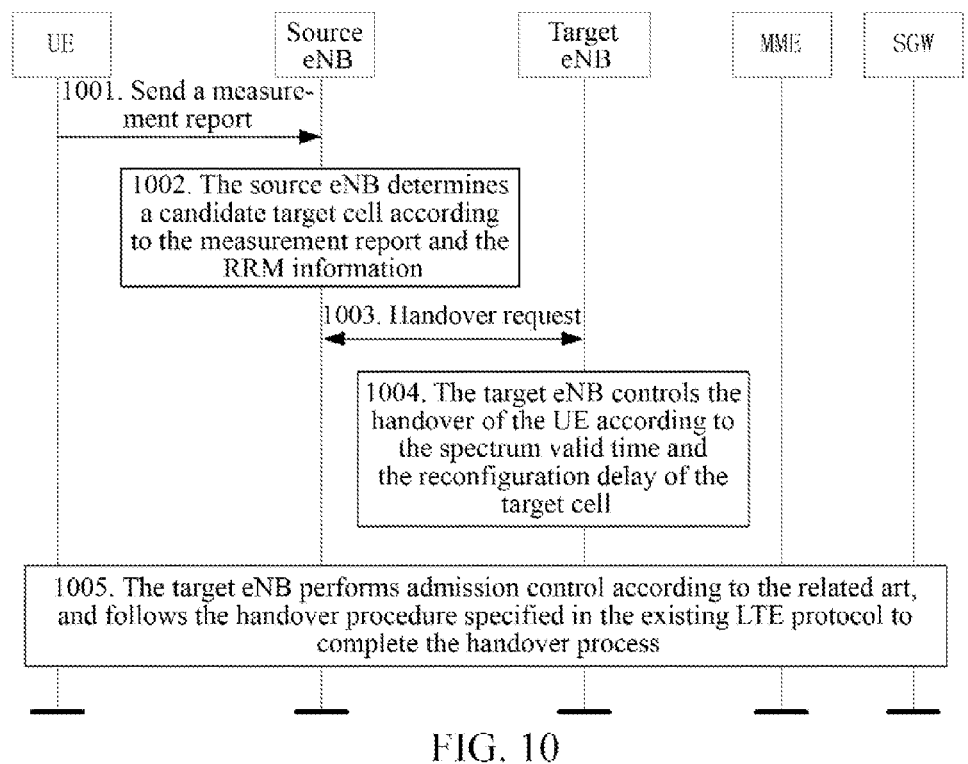
FIG. 10 is a schematic diagram of the process of the target eNB implementing a handover control according to the spectrum valid time and the reconfiguration delay of the target cell in accordance with a sixth application example of the present document.

This example describes the process of the target eNB implementing a handover control according to the spectrum valid time and the reconfiguration delay of the target cell. As shown in FIG. 10, it comprises the following steps:

the steps 1001-1003 are the same as the steps 901-903 and are not repeated here.

In Step 1004, the target eNB controls the handover of the UE according to the spectrum valid time and the reconfiguration delay of the target cell after receiving the handover request message from the source eNB;

taking the spectrum valid time threshold as 1 minute and the reconfiguration delay threshold value as 100 milliseconds (since the UE has a voice service, the reconfiguration delay threshold is selected as 100 ms) for example, assuming that the Cell1 is the target cell, the spectrum valid time of the TVWS in which the Cell1 is currently operating is 1.5 minutes, and the reconfiguration delay is 90 milliseconds, at this time the spectrum valid time of the Cell1 is greater than the spectrum valid time threshold value, 1 minute, and the reconfiguration delay, 90 milliseconds, is less than the reconfiguration delay threshold, 100 milliseconds, therefore it can be ensured that the UE offline due to the spectrum reconfiguration delay of the target cell being too long after the UE hands over to the target cell Cell1 can be avoided;

in step 1005, the target eNB performs admission control according to the related art, and then executes the handover procedure specified in the existing LTE protocol to finally complete the handover of the user equipment to the target cell.

The Seventh Application Example

Figure 11:
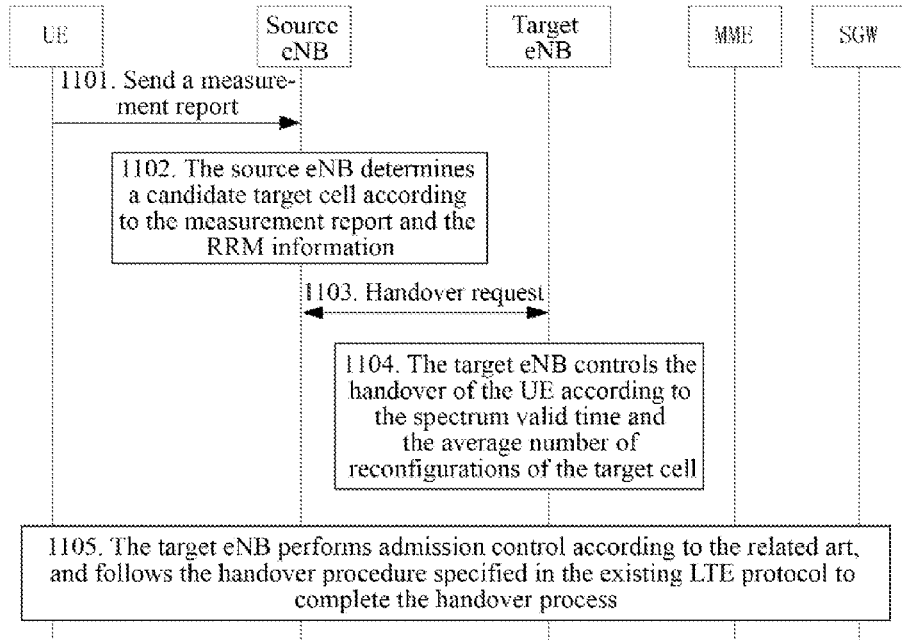
FIG. 11 is a schematic diagram of the process of the target eNB implementing a handover control according to the spectrum valid time and the average number of reconfigurations of the target cell in accordance with a seventh application example of the present document.

This example describes the process of the target eNB implementing a handover control according to the spectrum valid time and the average number of reconfigurations of the target cell. As shown in FIG. 11, it comprises the following steps:

the steps 1101-1103 are the same as the steps 901-903 and are not repeated here.

In Step 1104, the target eNB controls the handover of the UE according to the spectrum valid time and the average number of reconfigurations of the target cell after receiving the handover request message from the source eNB;

taking the spectrum valid time threshold as 1 minute and the threshold of the average number of reconfigurations as 0.5 times per hour for example, assuming that the Cell1 is the target cell, the spectrum valid time of the TVWS in which the Cell1 is currently operating is 1.5 minutes, and the average number of reconfigurations is 0.2 times per hour, at this time the spectrum valid time of the Cell1 is greater than the spectrum valid time threshold value, 1 minute, and the average number of reconfigurations, 0.2 times per hour, is less than the threshold of the average number of reconfigurations, 0.5 times per hour, therefore it can be ensured that the user experience of the UE will not be affected by the frequent reconfigurations in the target cell after the UE hands over to the target cell Cell1;

in step 1105, the target eNB performs admission control according to the related art, and then executes the handover procedure specified in the existing LTE protocol to finally complete the handover of the user equipment to the target cell.

The Eighth Application Example

Figure 12:
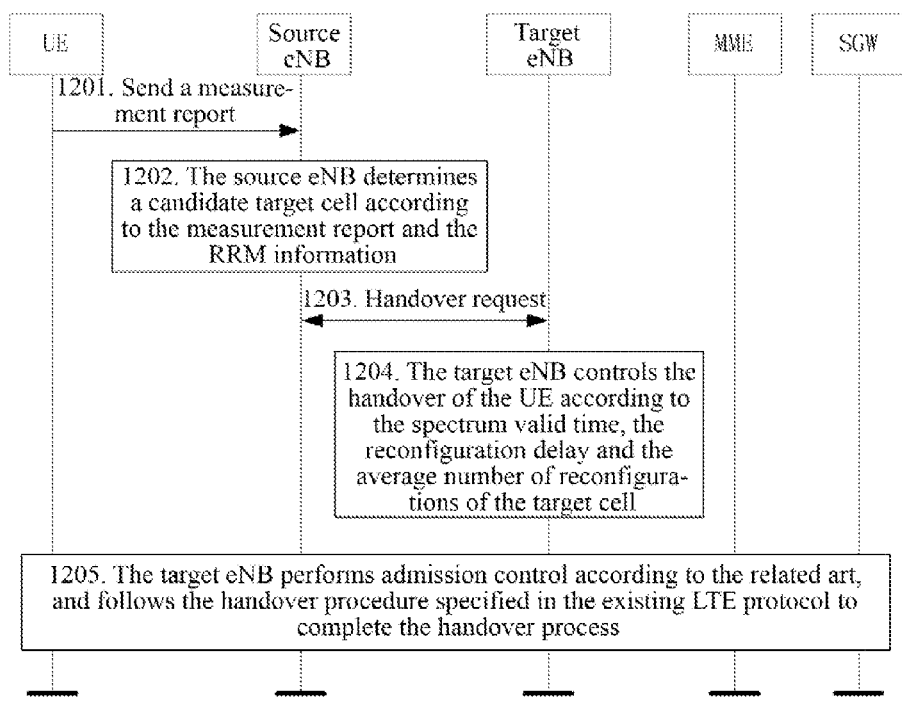
FIG. 12 is a schematic diagram of the process of the target eNB implementing a handover control according to the spectrum valid time, the reconfiguration delay and the average number of reconfigurations of the target cell in accordance with an eighth application example of the present document.

This example describes the process of the target eNB implementing a handover control according to the spectrum valid time, the relocation delay and the average number of reconfigurations of the target cell. As shown in FIG. 12, it comprises the following steps:

the steps 1201-1203 are the same as the steps 901-903 and are not repeated here.

In Step 1204, the target eNB controls the handover of the UE according to the spectrum valid time, the reconfiguration delay and the average number of reconfigurations of the target cell after receiving the handover request message from the source eNB;

taking the spectrum valid time threshold as 1 minute, the reconfiguration delay threshold as 100 milliseconds and the threshold of the average number of reconfigurations as 0.5 times per hour for example, assuming that the Cell1 is the target cell, the spectrum valid time of the TVWS in which the Cell1 is currently operating is 1.5 minutes, the reconfiguration delay is 90 milliseconds and the average number of reconfigurations is 0.2 times per hour, at this time the spectrum valid time of the Cell1 is greater than the spectrum valid time threshold value, 1 minute, and the reconfiguration delay, 90 milliseconds, is less than the reconfiguration delay threshold value, 100 millisecond, and the average number of reconfigurations, 0.2 times per hour, is less than the threshold of the average number of reconfigurations, 0.5 times per hour, therefore it can be ensured that after the UE hands over to the target cell Cell1, the UE offline due to the spectrum reconfiguration delay of the target cell being too long can be avoided, and the user experience of the UE will not be affected by the frequent reconfigurations in the target cell;

in step 1205, the target eNB performs admission control according to the related art, and then executes the handover procedure specified in the existing LTE protocol to finally complete the handover of the user equipment to the target cell.

The above description is only for preferred embodiments of the present document and is not intended to limit the protection scope of the present document.

Those ordinarily skilled in the art can understand that all or some of steps of the abovementioned method may be completed by the programs instructing the relevant hardware, and the programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function module. The present document is not limited to any specific form of combination of hardware and software.

Of course, the present document may have a variety of other embodiments, and without departing from the spirit and essence of the present document, a person skilled in the art can make various changes and modifications according to the present document, and these corresponding changes and modifications should belong to the protection scope of the appended claims of the present document.

INDUSTRIAL APPLICABILITY

Using the technical scheme of the present application to control the cell handover process of the user equipment can hand over the user equipment to the appropriate target cell as far as possible, and specifically address the problem of handover failure due to the spectrum resource reconfiguration occurred in the target cell during a UE handover process, as well as the problem of interruptions in the UE service and frequent handovers due to the spectrum resource reconfiguration occurred in the target cell after the UE hands over to the target cell.

What is claimed is:
1. A method for controlling a handover in a cognitive radio system, comprising:
a source base station receiving a measurement report sent by a user equipment;
the source base station determining a candidate target cell according to the measurement report and radio resource management information, and controlling a handover of the user equipment according to reconfiguration related information of the candidate target cell;

wherein the reconfiguration related information comprises one or more of the following contents: spectrum valid time, reconfiguration delay, and an average number of reconfigurations; wherein the spectrum valid time refers to a length of a time from a current time point to a time point at which a current cell exits from a current operating spectrum; the reconfiguration delay refers to a time need by the current cell to complete a reconfiguration process; the average number of reconfigurations refers to a number of reconfigurations in a preset period of time;

wherein, said controlling the handover of the user equipment according to the reconfiguration related information of the candidate target cell comprises:

judging whether the spectrum valid time of the candidate target cell is greater than a spectrum valid time threshold or not, when the spectrum valid time of the candidate target cell is greater than the spectrum valid time threshold, the source base station selecting the candidate target cell as a target cell of the handover, and sending a handover request message to a base station to which the target cell belongs, so as to complete the handover of the user equipment to the target cell; or judging whether the reconfiguration delay of the candidate target cell is less than a reconfiguration delay threshold required by a service of the user equipment or not, when the reconfiguration delay of the candidate target cell is less than the reconfiguration delay threshold required by the service of the user equipment, the source base station selecting the candidate target cell as a target cell of the handover, and sending a handover request message to a base station to which the target cell belongs, so as to complete the handover of the user equipment to the target cell; or judging whether the average number of reconfigurations of the candidate target cell is less than a threshold of the average number of the reconfigurations or not, when the average number of reconfigurations of the candidate target cell is less than the threshold of the average number of reconfigurations, the source base station selecting the candidate target cell as a target cell of the handover, and sending a handover request message to a base station to which the target cell belongs, so as to complete the handover of the user equipment to the target cell; or judging whether the spectrum valid time of the candidate target cell is greater than a spectrum valid time threshold or not, when the spectrum valid time of the candidate target cell is greater than the spectrum valid time threshold, judging whether the reconfiguration delay of the candidate target cell is less than a reconfiguration delay threshold required by a service of the user equipment or not, when the reconfiguration delay of the candidate target cell is less than the reconfiguration delay threshold required by the service of the user equipment, the source base station selecting the candidate target cell as a target cell of the handover, and sending a handover request message to a base station to which the target cell belongs, so as to complete the handover of the user equipment to the target cell; or judging whether the spectrum valid time of the candidate target cell is greater than a spectrum valid time threshold or not, when the spectrum valid time of the candidate target cell is greater than the spectrum valid time threshold, judging whether the average number of reconfigurations of the candidate target cell is less than a threshold of the average number of reconfigurations or not, when the average number of reconfigurations of the candidate target cell is less than the threshold of the average number of reconfigurations, the source base station selecting the candidate target cell as a target cell of the handover, and sending a handover request message to a base station to which the target cell belongs, so as to complete the handover of the user equipment to the target cell; or judging whether the reconfiguration delay of the candidate target cell is less than a reconfiguration delay threshold required by a service of the user equipment or not, when the reconfiguration delay of the candidate target cell is less than the reconfiguration delay threshold required by the service of the user equipment, judging whether the average number of reconfigurations of the candidate target cell is less than a threshold of the average number of reconfigurations or not, when the average number of reconfigurations of the candidate target cell is less than the threshold of the average number of reconfigurations, the source base station selecting the candidate target cell as a target cell of the handover, and sending a handover request message to a base station to which the target cell belongs, so as to complete the handover of the user equipment to the target cell; or judging whether the spectrum valid time of the candidate target cell is greater than a spectrum valid time threshold or not, when the spectrum valid time of the candidate target cell is greater than the spectrum valid time threshold, judging whether the reconfiguration delay of the candidate target cell is less than a reconfiguration delay threshold required by a service of the user equipment or not, when the reconfiguration delay of the candidate target cell is less than the reconfiguration delay threshold required by the service of the user equipment, judging whether the average number of reconfigurations of the candidate target cell is less than a threshold of the average number of reconfigurations or not, when the average number of reconfigurations of the candidate target cell is less than the threshold of the average number of reconfigurations, the source base station selecting the candidate target cell as a target cell of the handover, and sending a handover request message to a base station to which the target cell belongs, so as to complete the handover of the user equipment to the target cell.

2. The method of claim 1, wherein, the reconfiguration related information of the candidate target cell is obtained by the source base station from a base station to which the candidate target cell belongs.

3. A method for controlling a handover in a cognitive radio system, comprising:

a source base station receiving a measurement report sent by a user equipment;

the source base station sending a handover request message to a target base station according to the measurement report and radio resource management information;

after receiving the handover request message, the target base station controlling a handover of the user equipment according to reconfiguration related information of the target cell;

wherein the reconfiguration related information comprises one or more of the following contents: spectrum valid time, reconfiguration delay, and an average number of reconfigurations; wherein: the spectrum valid time refers to a length of a time from a current time point to a time point at which a current cell exits from a current operating spectrum; the reconfiguration delay refers to a time needed by the current cell to complete a reconfiguration process; the average number of reconfigurations refers to a number of reconfigurations in a preset period of time;

wherein, said controlling a handover of the user equipment according to reconfiguration related information of the target cell comprises:

judging whether the spectrum valid time of the target cell is greater than a spectrum valid time threshold or not, when the spectrum valid time of the target cell is greater than the spectrum valid time threshold, performing admission control on the user equipment, so as to complete the handover of the user equipment to the target cell; or judging whether the reconfiguration delay of the target cell is less than a reconfiguration delay threshold required by the service of the user equipment or not, when the reconfiguration delay of the target cell is less than the reconfiguration delay threshold required by a service of the user equipment, performing admission control on the user equipment, so as to complete the handover of the user equipment to the target cell; or judging whether the average number of reconfigurations of the target cell is less than a threshold of the average number of the reconfigurations or not, when the average number of reconfigurations of the target cell is less than the threshold of the average number of reconfigurations, performing admission control on the user equipment, so as to complete the handover of the user equipment to the target cell; or judging whether the spectrum valid time of the target cell is greater than a spectrum valid time threshold or not, when the spectrum valid time of the target cell is greater than the spectrum valid time threshold, judging whether the reconfiguration delay of the target cell is less than a reconfiguration delay threshold required by a service of the user equipment or not, when the reconfiguration delay of the target cell is less than a reconfiguration delay threshold required by the service of the user equipment, performing admission control on the user equipment, so as to complete the handover of the user equipment to the target cell; or judging whether the spectrum valid time of the target cell is greater than a spectrum valid time threshold or not, when the spectrum valid time of the target cell is greater than the spectrum valid time threshold, judging whether the average number of reconfigurations of the target cell is less than a threshold of the average number of reconfigurations or not, when the average number of reconfigurations of the target cell is less than the threshold of the average number of reconfigurations, performing admission control on the user equipment, so as to complete the handover of the user equipment to the target cell; or judging whether the reconfiguration delay of the target cell is less than a reconfiguration delay threshold required by a service of the user equipment or not, when the reconfiguration delay of the target cell is less than a reconfiguration delay threshold required by the service of the user equipment, judging whether the average number of reconfigurations of the target cell is less than a threshold of the average number of reconfigurations or not, when the average number of reconfigurations of the target cell is less than the threshold of the average number of reconfigurations, performing admission control on the user equipment, so as to complete the handover of the user equipment to the target cell; or judging whether the spectrum valid time of the target cell is greater than a spectrum valid time threshold or not, when the spectrum valid time of the target cell is greater than the spectrum valid time threshold, judging whether the reconfiguration delay of the target cell is less than a reconfiguration delay threshold required by a service of the user equipment or not, when the reconfiguration delay of the target cell is less than the reconfiguration delay threshold required by the service of the user equipment, judging whether the average number of reconfigurations of the target cell is less than a threshold of the average number of reconfigurations or not, when the average number of reconfigurations of the candidate target cell is less than the threshold of the average number of reconfigurations, performing admission control on the user equipment, so as to complete the handover of the user equipment to the target cell.

4. An apparatus for controlling a handover in a cognitive radio system, wherein the apparatus is located in a source base station, the source base station comprises a processor, and a storage device for storing computer executable instructions that when executed by the processor cause the processor to perform the steps in following modules:

a receiving module is configured to receive a measurement report sent by a user equipment;

a handover controlling module, comprising a candidate target cell determining unit and a handover controlling unit, wherein:

the candidate target cell determining unit is configured to determine a candidate target cell according to the measurement report and radio resource management information;

the handover controlling unit is configured to control a handover of the user equipment according to reconfiguration related information of the candidate target cell;

wherein the reconfiguration related information comprises one or more of the following contents: spectrum valid time, reconfiguration delay, and an average number of reconfigurations; wherein: the spectrum valid time refers to a length of a time from a current time point to a time point at which a current cell exits from a current operating spectrum; the reconfiguration delay refers to a time needed by the current cell to complete a reconfiguration process; the average number of reconfigurations refers to a number of reconfigurations in a preset period of time;

wherein, the handover controlling unit being configured to control the handover of the user equipment according to the reconfiguration related information of the candidate target cell, comprises:

the handover controlling unit judging whether the spectrum valid time of the candidate target cell is greater than a spectrum valid time threshold or not, when the spectrum valid time of the candidate target cell is greater than the spectrum valid time threshold, the source base station selecting the candidate target cell as a target cell of the handover, and sending a handover request message to a base station to which the target cell belongs, so as to complete the handover of the user equipment to the target cell; or the handover controlling unit judging whether the reconfiguration delay of the candidate target cell is less than a reconfiguration delay threshold required by a service of the user equipment or not, when the reconfiguration delay of the candidate target cell is less than the reconfiguration delay threshold required by the service of the user equipment, the handover controlling unit selecting the candidate target cell as a target cell of the handover, and sending a handover request message to a base station to which the target cell belongs, so as to complete the handover of the user equipment to the target cell; or the handover controlling unit judging whether the average number of reconfigurations of the candidate target cell is less than a threshold of the average number of the reconfigurations or not, when the average number of reconfigurations of the candidate target cell is less than the threshold of the average number of reconfigurations, the handover controlling unit selecting the candidate target cell as a target cell of the handover, and sending a handover request message to a base station to which the target cell belongs, so as to complete the handover of the user equipment to the target cell; or the handover controlling unit judging whether the spectrum valid time of the candidate target cell is greater than a spectrum valid time threshold or not, when the spectrum valid time of the candidate target cell is greater than the spectrum valid time threshold, judging whether the reconfiguration delay of the candidate target cell is less than a reconfiguration delay threshold required by a service of the user equipment or not, when the reconfiguration delay of the candidate target cell is less than the reconfiguration delay threshold required by the service of the user equipment, the handover controlling unit selecting the candidate target cell as a target cell of the handover, and sending a handover request message to a base station to which the target cell belongs, so as to complete the handover of the user equipment to the target cell; or the handover controlling unit judging whether the spectrum valid time of the candidate target cell is greater than a spectrum valid time threshold or not, when the spectrum valid time of the candidate target cell is greater than the spectrum valid time threshold, judging whether the average number of reconfigurations of the candidate target cell is less than a threshold of the average number of reconfigurations or not, when the average number of reconfigurations of the candidate target cell is less than the threshold of the average number of reconfigurations, the handover controlling unit selecting the candidate target cell as a target cell of the handover, and sending a handover request message to a base station to which the target cell belongs, so as to complete the handover of the user equipment to the target cell; or the handover controlling unit judging whether the reconfiguration delay of the candidate target cell is less than a reconfiguration delay threshold required by a service of the user equipment or not, when the reconfiguration delay of the candidate target cell is less than the reconfiguration delay threshold required by the service of the user equipment, judging whether the average number of reconfigurations of the candidate target cell is less than a threshold of the average number of reconfigurations or not, when the average number of reconfigurations of the candidate target cell is less than the threshold of the average number of reconfigurations, the handover controlling unit selecting the candidate target cell as a target cell of the handover, and sending a handover request message to a base station to which the target cell belongs, so as to complete the handover of the user equipment to the target cell; or the handover controlling unit judging whether the spectrum valid time of the candidate target cell is greater than a spectrum valid time threshold or not, when the spectrum valid time of the candidate target cell is greater than the spectrum valid time threshold, judging whether the reconfiguration delay of the candidate target cell is less than a reconfiguration delay threshold required by a service of the user equipment or not, when the reconfiguration delay of the candidate target cell is less than the reconfiguration delay threshold required by the service of the user equipment, judging whether the average number of reconfigurations of the candidate target cell is less than a threshold of the average number of reconfigurations or not, when the average number of reconfigurations of the candidate target cell is less than the threshold of the average number of reconfigurations, the handover controlling unit selecting the candidate target cell as a target cell of the handover, and sending a handover request message to a base station to which the target cell belongs, so as to complete the handover of the user equipment to the target cell.

5. The apparatus of claim 4,
wherein, the reconfiguration related information of the candidate target cell is obtained by the source base station from a base station to which the candidate target cell belongs.

6. An apparatus for controlling a handover in a cognitive radio system, wherein the apparatus is located in a base station, the base station comprises a processor, and a storage device for storing computer executable instructions that when executed by the processor cause the processor to perform the steps in following modules:

a source base station processing module is configured to: when the base station is a source base station, receive a measurement report sent by a user equipment, determine a target cell according to the measurement report and radio resource management information, and send a handover request message to a target base station;

a target base station processing module is configured to: when the base station is a target base station, after receiving a handover request message, control a handover of a user equipment according to reconfiguration related information of a target cell;

wherein the reconfiguration related information comprises one or more of the following contents: spectrum valid time, reconfiguration delay, and an average number of reconfigurations; wherein: the spectrum valid time refers to a length of a time from a current time point to a time point at which a current cell exits from a current operating spectrum; the reconfiguration delay refers to a time needed by the current cell to complete a reconfiguration process; the average number of reconfigurations refers to a number of reconfigurations in a preset period of time;

wherein, the target base station processing module being configured to control a handover of a user equipment according to reconfiguration related information of a target cell, comprises:

the target base station processing module judging whether the spectrum valid time of the target cell is greater than a spectrum valid time threshold or not, when the spectrum valid time of the target cell is greater than the spectrum valid time threshold, performing admission control on the user equipment, so as to complete the handover of the user equipment to the target cell; or the target base station processing module judging whether the reconfiguration delay of the target cell is less than a reconfiguration delay threshold required by a service of the user equipment or not, when the reconfiguration delay of the target cell is less than the reconfiguration delay threshold required by the service of the user equipment, performing admission control on the user equipment, so as to complete the handover of the user equipment to the target cell; or the target base station processing module judging whether the average number of reconfigurations of the target cell is less than a threshold of the average number of the reconfigurations or not, when the average number of reconfigurations of the target cell is less than the threshold of the average number of reconfigurations, performing admission control on the user equipment, so as to complete the handover of the user equipment to the target cell; or the target base station processing module judging whether the spectrum valid time of the target cell is greater than a spectrum valid time threshold or not, when the spectrum valid time of the target cell is greater than the spectrum valid time threshold, judging whether the reconfiguration delay of the target cell is less than a reconfiguration delay threshold required by a service of the user equipment or not, when the reconfiguration delay of the target cell is less than the reconfiguration delay threshold required by the service of the user equipment, performing admission control on the user equipment, so as to complete the handover of the user equipment to the target cell; or the target base station processing module judging whether the spectrum valid time of the target cell is greater than a spectrum valid time threshold or not, when the spectrum valid time of the target cell is greater than the spectrum valid time threshold, judging whether the average number of reconfigurations of the target cell is less than a threshold of the average number of reconfigurations or not, when the average number of reconfigurations of the target cell is less than the threshold of the average number of reconfigurations, performing admission control on the user equipment, so as to complete the handover of the user equipment to the target cell; or the target base station processing module judging whether the reconfiguration delay of the target cell is less than a reconfiguration delay threshold required by a service of the user equipment or not, when the reconfiguration delay of the target cell is less than the reconfiguration delay threshold required by the service of the user equipment, judging whether the average number of reconfigurations of the target cell is less than a threshold of the average number of reconfigurations or not, when the average number of reconfigurations of the target cell is less than the threshold of the average number of reconfigurations, performing admission control on the user equipment, so as to complete the handover of the user equipment to the target cell; or the target base station processing module judging whether the spectrum valid time of the target cell is greater than a spectrum valid time threshold or not, when the spectrum valid time of the target cell is greater than the spectrum valid time threshold, judging whether the reconfiguration delay of the target cell is less than a reconfiguration delay threshold required by a service of the user equipment or not, when the reconfiguration delay of the target cell is less than the reconfiguration delay threshold required by the service of the user equipment, judging whether the average number of reconfigurations of the target cell is less than a threshold of the average number of reconfigurations or not, when the average number of reconfigurations of the candidate target cell is less than the threshold of the average number of reconfigurations, performing admission control on the user equipment, so as to complete the handover of the user equipment to the target cell.

* * * * *